United States Patent Office 3,044,988
Patented July 17, 1962

3,044,988
POLYESTERS FROM FLUORINATED GLYCOLS AND PROCESS OF MAKING SAME
Gerhard F. Ottmann, Hamden, Conn., assignor to Olin Mathieson Chemical Corporation, a corporation of Virginia
No Drawing. Filed Dec. 19, 1960, Ser. No. 76,514
10 Claims. (Cl. 260—75)

This invention relates to novel polymerization products. It has been found that new and useful fluorine-containing polymers can be obtained by polycondensation of polyfluorinated glycols of the formula:

$$HOCH_2(CF_2)_nCH_2OH$$

wherein $n$ is an integer of from 1 to 4, with the lower alkyl esters of 2,5-dihydroxyhexahydro-terephthalic acid (I)

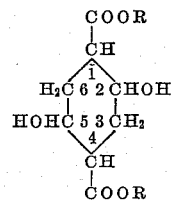

In this formula, R is an alkyl group of from 1 to 8 carbon atoms. The compounds I have the critical distinctions from terephthalic acid of being fully saturated hydroaromatic compounds, not aromatics, and being tetrafunctional, bearing two different groups of functions, each of different reactivity.

The polymers produced by the process of this invention are extremely resistant to chemical action of organic solvents, mineral acids, and concentrated solutions of aqueous alkali. For example, samples of the polymers remained unchanged when stored in concentrated hydrochloric acid or 40 percent aqueous sodium hydroxide at room temperature for one week. The remarkable resistance of the fluorine-containing polymers of this invention to the action of organic solvents is a very important property which distinguishes them favorably from other materials of this type. When fluorine-containing polymers produced in accordance with this invention were stored for two days at room temperature in such organic solvents as cyclohexane, p-xylene, petroleum ether, carbon tetrachloride, chloroform, ethyl ether, diethylene glycol diethyl ether, dioxane, diethylamine, methanol, ethanol, cyclohexanol, carbon disulphide, and tetrahydrofurfuryl oleate, it was found that the physical properties were not affected. In contrast, when polymers produced from polyglycols and the lower alkyl esters of 2,5-dihydroxyhexahydroterephthalic acid are subjected to similar treatment considerable swelling results. The polymers of this invention possess the general property of extremely good heat resistance. They can be heated at temperatures up to 300° C. for long periods of time without losing their elastic properties.

Useful polyfluorinated glycols include 2,2-difluoropropanediol, 2,2,3,3-tetrafluorobutanediol, 2,2,3,3,4,4-hexafluoropentanediol and 2,2,3,3,4,4,5,5-octafluorohexanediol. These polyfluorinated glycols can be obtained from the corresponding acids by reduction with lithium aluminum hydride in ether as described in A. C. S. Monograph, Aliphatic Fluorine Compounds by A. M. Lovelace, W. Postelnek and D. A. Rausch. Polyfluorinated glycols are weak acids and, thus, are distinctly different from the ordinary glycols which show a neutral reaction. It is altogether unexpected that polyesters can be synthesized from the lower alkyl esters of 2,5-dihydroxy-hexahydrotrephthalic acid and the polyfluorinated glycols.

The lower alkyl esters of the acid can be prepared, for example, as described in copending Grundmann and Ottmann patent application Serial No. 786,464 filed January 13, 1959, by the reduction of alkyl esters of succinylo-succinic acid with hydrogen under elevated temperature and pressure and in the presence of a nickel or copper chromite catalyst.

By the term lower alkyl esters of 2,5-dihydroxy-hexahydro-terephthalic acid, it is meant esters of aliphatic alcohols of from 1 to 4 carbon atoms, such as the dimethyl-, the diethyl-, the dipropyl-, the diisopropyl-, and the dibutyl-esters. The preferred ester is dimethyl-2,5-dihydroxy-hexahydroterephthalate. This compound is preferred for economic reasons, since it can be prepared from methanol. The low boiling point of the dimethyl ester allows easy removal during the transesterification process, and, contrary to higher alkyl esters, the dimethyl ester is a crystalline solid which is easy to handle and purify. It is to be understood that the lower alkyl esters of 2,5-dihydroxy-hexahydro-terephthalic acid, prepared according to copending application Serial No. 786,464, are always mixtures of at least two stereo-isomers. It is, however, not necessary to employ a sterically uniform material to obtain useful polymers.

Although the structural formula of the polymers of this invention has not been definitely established the equations below present one possible reaction scheme for the formation of these polymers. In the equations R is an alkyl group of 1 to 4 carbon atoms and S indicates that the ring is saturated.

(1) TRANSESTERIFICATION

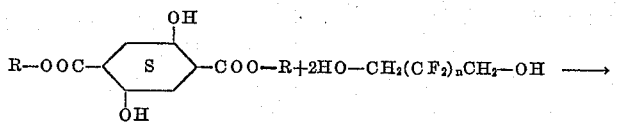

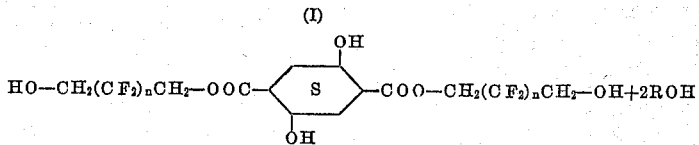

(2) FORMATION OF CHAIN TYPE POLYESTERS

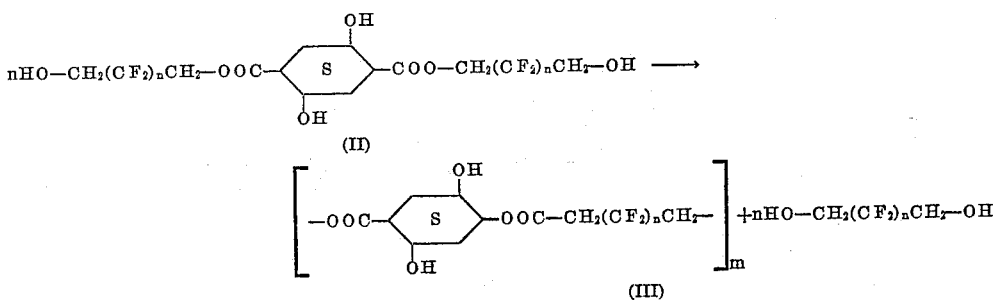

(3) CROSS-LINKING OF THE CHAIN TYPE POLYESTERS BY ETHER BRIDGES

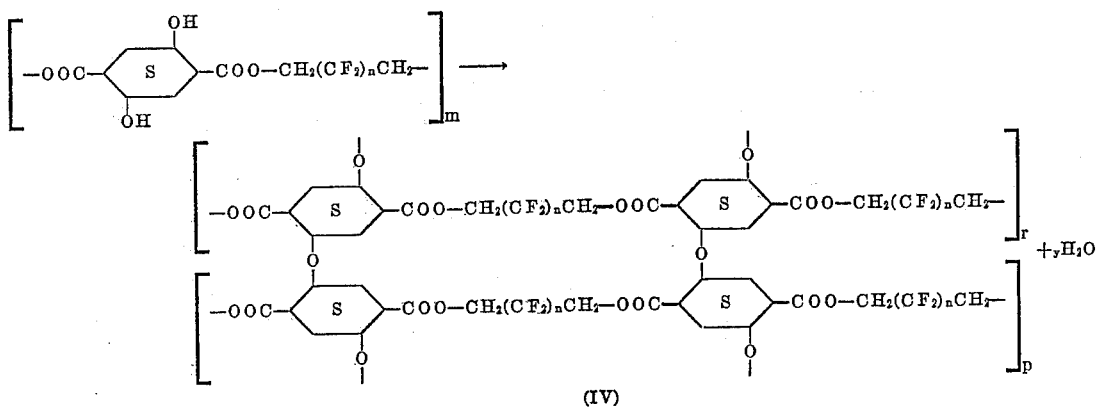

Preparation of the final valuable polymers of this invention is completed in three separate phases. In the first step the lower alkyl ester of 2,5-dihydroxy-hexahydro-terephthalic acid is transesterified with the polyfluorinated glycol employed, in the presence of a transesterification catalyst. It has been found that a transesterification catalyst is necessary to achieve a practical rate of reaction when preparing the transesterification product of a polyfluorinated glycol and a lower alkyl ester of 2,5-dihydroxy-hexahydro-terephthalic acid. In contrast, the polyglycols and the lower alkyl esters of 2,5-dihydroxy-hexahydro-terephthalic acid react at a reasonable rate to form transesterification products without the use of an esterification catalyst. In general, the molar ratio of the polyfluorinated glycol to the lower dialkyl ester of 2,5-dihydroxy-hexahydro-terephthalic acid will be from about 1:1 to about 3:1 with the preferred ratio being from about 1:1 to 1.5:1. The transesterification reaction is completed in about 1 to about 5 hours and at a temperature within the range of from about 110° C. to about 210° C. The preferred temperature for this phase is high enough to allow the alcohol formed to be distilled off, if necessary by means of distillation column. In this way the equilibrium will be constantly shifted toward the formation of the desired transesterification product. Suitable catalysts include the alkali metal alkoxides, such as sodium methylate or potassium tertiary butylate, the oxides of the metals of the group II of the periodic system of the elements, such as magnesium, calcium, barium or zinc. Further useful catalysts are the halides of weak bases like ammonium chloride, aluminum chloride and zinc chloride. The preferred type of catalysts, however, are strongly acidic, including the strong mineral acids, as exemplified by sulfuric acid, or its acid salts like potassium bisulfate, phosphoric acid, and the hydrogen halides, such as hydrogen chloride and hydrogen bromide. Other useful catalysts include the organic derivatives of polyfunctional inorganic acids like methane sulfonic acid, benzenesulfonic acid, p-toluenesulfonic acid, the naphthalene-disulfonic acids, phenylphosphoric acids, and p-tolylboronic acid. Strong organic carboxylic acids, such as trifluoroacetic acid, chloroacetic acid, and trichloroacetic acid can also be used as catalysts. Generally about 0.1 to 1.0 weight percent of the catalyst based on the weight of the ester can be used, depending upon the particular catalyst. In the second phase of the polymerization process (2) the formation of chain-type polyesters takes place by a polycondensation reaction. In this step long chains of the polyester molecules are formed by polycondensation of the intermediate II with itself, thereby splitting off one molecule-equivalent of the employed polyfluorinated glycol compound.

The second reaction step (2), in general, for a reasonable rate requires a somewhat higher reaction temperature. This reaction occurs at a satisfactory rate within a temperature range of from about 200° C. to about 310° C. The progress of the polymerization at this stage can be measured by the change in viscosity of the reaction mixture which increases considerably as the reaction proceeds. A reaction time of from about 3 to about 30 hours or more is required for this second phase. Any desired degree of polymerization of this polyester intermediate can be attained by proper control of temperature and reaction time. Surprisingly, it has been found that in order to obtain a satisfactory polycondensate product it is necessary to carry out this phase of the reaction in the presence of a condensation catalyst. Further it is necessary that this catalyst be added at the end of the esterification reaction since it has been found that if the esterification catalyst and the condensation catalyst are added simultaneously at the beginning of the reaction the catalytic activity of the condensation catalyst is destroyed in some way, perhaps through decomposition, during the transesterification step. After the transesterification step has been completed, as evidenced by the measurement of the theoretical quantity of alcohol being produced in the reaction, an amount of from 0.1 percent by weight to 1.0 percent by weight of the condensation catalyst based on the weight of the lower alkyl ester of 2,5-dihydroxy-hexahydro-terephthalic acid introduced is added to the reaction mixture and the temperature of the transesterification product is raised as previously mentioned to from about 200° C. to about 310° C. Suitable condensation catalysts include antimony trioxide, bismuth trioxide, titanium dioxide, calcium oxide, magnesium oxide, aluminum oxide, lithium carbonate, etc. To obtain a workable condensate consisting of the chain-type polyester intermediates III, the reaction is stopped short of gelation or just after the gelation begins to occur. The chain-type polyester intermediate III has a melting or softening point of between 125° C. and about 175° C. In the third or final step of the formation of the polyester of this invention cross-linking of the above-described, chain-type polyester intermediates III is accomplished by the elimination of water between two hydroxyl groups belonging to two different chains with the formation of an ether bridge. The temperature at which this cross-linking reaction occurs depends as previously described on the reactants employed and on the catalyst. In general, it lies between about 200° C. and about 320° C. The final step of preparing the cross-linked polymer can be advantageously carried out by forming and curing the condensate product in a mold at temperatures ranging from about 200° C. to about 320° C. and under a pressure ranging from 4,000 to 8,000 p.s.i. The curing time may be varied widely depending upon the properties desired but, in general, it will be between about 0.5 to about 10 hours depending somewhat on the thickness of the sample in the mold. The final step of preparing the cross-linked polymer of this invention can be carried out in the same reaction kettle in which the esterification reaction and the condensation reaction are completed, however, in most instances it is more advantageous to transfer the condensation product to a mold where it is formed and cured under compression.

A wide variation in the character of the finally resulting polymers can be obtained depending upon the catalysts used, the employed polyfluorinated glycol, and also on the ratio of the reaction components as will be shown in more detail below in a number of examples of the invention. Elastomers to very hard, but not brittle, resins with high mechanical strength can be produced. Colored and opaque materials can also be prepared. In addition, polymers can be obtained which possess an exceptionally high adhesiveness to glass, metals, ceramic materials, wood and plastics.

The above described properties, especially elasticity, high mechanical strength, excellent resistance to solvent action, excellent adhesive properties combined with extraordinary thermal stability make these new polymers especially valuable in a wide variety of applications. The adhesiveness of these polymers makes them particularly suitable for coatings for metals, glass or ceramic materials particularly for the manufacture of laminated splinter-proof glass. The products of this invention are useful for the production of plastic articles such as molded articles and castings of sheets, rods, tubes and massive pieces.

This invention will be further illustrated by the following examples.

*Example I*

An amount of 4.64 grams (1/50 mole) of dimethyl-2,5-dihydroxyhexahydro-terephthalate, 4.24 grams (1/50 mole) of 2,2,3,3,4,4-hexafluoropentanediol and 10 milligrams of calcium chloride were heated from room temperature to a temperature of 190° C. over a two hour period, while a slow stream of nitrogen was passed through the melt. During this initial heating period methanol formed in the reaction was distilled from the reaction mixture. The reaction mixture was maintained at this temperature for an additional one hour period to facilitate complete control of the methanol from the reaction mixture and at the end of that time 15 milligrams of antimony trioxide was added. Then the temperature of the reaction mixture was raised to 240° C. and heating at this temperature was continued for 16 hours at which time the gel point of the reaction mixture was reached. The viscous reaction mixture which had steadily increased its viscosity during the heating periods, was cooled to room temperature. The polycondensate product was then subjected to compression molding at 280° C. under a ram pressure of 4,800 p.s.i. for one hour. In this manner a cured disc of the polymeric product was obtained (2 inches in diameter, ¼ inch in thickness) which, although stiff, possessed elastic properties, a high tensile strength, and had an elongation of approximately 300 to 350 percent.

*Example II*

The experiment of Example I was repeated using 10 milligrams of bismuth trioxide as the condensation catalyst in place of the antimony trioxide previously mentioned. With the exception of the different catalyst all other conditions of the experiment were the same as in Example I. The polycondensate product formed was subjected to compression molding at 280° C. under a ram pressure of 4,800 p.s.i. yielding a stiff polymer of high tensile strength.

*Example III*

In this experiment all conditions were identical with those of Example I with the exception that the antimony trioxide was replaced with 10 milligrams of titanium dioxide. Compression molding under the conditions of Example I of the viscous polycondensate product formed gave a hard polymer with elastic properties.

*Example IV*

An amount of 4.64 grams (1/50 mole) of dimethyl-2,5-dihydroxyhexahydro - terephthalate, 4.24 grams (1/50 mole) of 2,2,3,3,4,4-hexafluoropentanediol and 10 milligrams of cadmium chloride were mixed together and heated to a temperature of 190° C. within a two hour period while a slow stream of nitrogen was passed through the melt. The reaction mixture was maintained as in Example I at this temperature for an additional hour and at the end of that time 15 milligrams of antimony trioxide was added. In the next step, the temperature was raised to 240° C. and heating continued at this temperature for an additional 16 hour period at which time the gel point of the reaction mixture was reached. The viscous reaction mixture was cooled to room temperature. In the final polymerization step the condensate product was cured by heating a quantity of the material in a mold at 280° C. under a ram pressure of 5,000 p.s.i. for a period of about one hour. The resulting polymeric product was similar to that produced in Example I in that it was elastic. In addition to having a higher tensile strength than the product of Example I, it was a softer material which exhibited slightly increased elongation.

*Example V*

An amount of 4.64 grams (1/50 mole) of dimethyl-2,5-dihydroxyhexahydro - terephthalate, 5.30 grams (3/100 mole) of 2,2,3,3,4,4-hexafluoropentanediol, and 10 milligrams of polyphosphoric acid were heated under a nitrogen atmosphere up to a temperature of about 190° C. in a two hour period. After the reaction mixture had been maintained at a temperature of 190° C. for an additional one hour heating time, 15 milligrams of antimony trioxide catalyst was added. The temperature of the reaction mixture was raised to about 260°–270° C. and this temperature was maintained for an additional 24 hour heating period. At this point gelation commenced and the reaction mixture was cooled to room temperature. One part of this polymeric condensate was cured in a mold at 316° C. under a ram pressure of 5,750 p.s.i. for about one-half hour. The result was a hard, flexible polymer. Another portion of the condensate material was spread on the surfaces of heated steel coupons and the sandwiched coupons baked in an oven at 290° C. for four hours at a pressure of 10 p.s.i. Shear strength values of 1,500 to 2,000 p.s.i. were measured for the adhesion of this polymer to steel at 22° C.

Examples VI–XII

In Examples VI–XII a number of other polymeric materials were prepared in the same manner as described in Examples I–V. Although various esterification catalysts were used, the properties of these polymers were comparable to those obtained in the previous examples. Experimental details relating the preparation of the polymers of Examples VI–XII are given in Table 1 which follows.

TABLE 1

| Example Number | Weight of ester (grams) | Weight of glycol (grams) | Transesterification | | | | Polycondensation | | | | Cross-Linking | | |
|---|---|---|---|---|---|---|---|---|---|---|---|---|---|
| | | | Catalyst | Weight (mg.) | Temp. (° C.) | Time (hours) | Catalyst | Weight (mg.) | Temp. (° C.) | Time (hours) | Temp. (° C.) | (Curing) Time (hours) | Pressure (p.s.i.) |
| VI | [1] 4.64 | [2] 4.24 | p-toluene sulfonic acid | 10 | [5] 190 | [6] 3 | Antimony Trioxide.[7] | 15 | 240 | 16 | 283 | 1 | 4,800–5,000 |
| VII | [1] 4.64 | [2] 4.24 | p-toluene sulfonyl chloride | 10 | [5] 190 | [6] 3 | ----do---------- | 15 | 240 | 16 | 283 | 1 | 4,800–5,000 |
| VIII | [1] 4.64 | [2] 4.24 | sodium sulfite | 10 | [5] 190 | [6] 3 | ----do---------- | 15 | 240 | 16 | 283 | 1 | 4,800–5,000 |
| IX | [1] 4.64 | [2] 4.24 | potassium bisulfate. | 10 | [5] 190 | [6] 3 | ----do---------- | 15 | 240 | 16 | 283 | 1 | 4,800–5,000 |
| X | [1] 4.64 | [2] 4.24 | phenyl-phosphonic acid. | 10 | [5] 190 | [6] 3 | ----do---------- | 15 | 240 | 16 | 283 | 1 | 4,800–5,000 |
| XI | [1] 4.64 | [2] 4.24 | polyphosphoric acid. | 10 | [5] 190 | [6] 3 | ----do---------- | 15 | 240 | 16 | 283 | 1 | 4,800–5,000 |
| XII | [1] 4.64 | [2] 4.24 | sulfonic acid | 10 | [5] 190 | [6] 3 | ----do---------- | 15 | 240 | 16 | 283 | 1 | 4,800–5,000 |

[1] The ester employed was dimethyl-2,5-dihydroxyhexahydro-terephthalate.
[2] The glycol employed was 2,2,3,3,4,4-hexafluoropentanediol.
[3] 0.02 mole.
[4] 0.02 mole.
[5] Maximum temperature of transesterification step.
[6] The temperature of the reaction mixture was gradually raised from room temperature to 190° C. over a two hour period and then maintained at 190° C. for an additional hour.
[7] Added at the end of the three hour transesterification step.

Example XIII

An amount of 4.64 grams (1/50 mole) of dimethyl-2,5-dihydroxy-hexahydro-terephthalate, 3.25 grams (1/50 mole) of 2,2,3,3-tetrafluorobutanediol, and 12 milligrams of p-toluene sulfonic acid are mixed together and the reaction mixture heated from room temperature to 200° C. over a period of 2.5 hours while a stream of nitrogen is passed through the melt. Heating of the reaction mixture is continued at a temperature of 200° C. for an additional one hour period and at the end of that time a total of 15 milligrams of bismuth trioxide is added. In the next step the reaction mixture is heated at a temperature of about 240° C. for 17 hours and the resulting viscous, polymeric, reaction material is then cooled to room temperature. Compression molding of this material at about 290° C. at a pressure of 5200 p.s.i. results in the formation of a stiff, cross-linked, polymeric material having plastic properties and a high tensile strength.

What is claimed is:

1. Resinous polymerization comprising the polymeric polycondensation products of a polyfluorinated glycol of the formula:

$$HOCH_2(CF_2)_nCH_2OH$$

wherein $n$ is an integer of from 1 to 4, with a lower alkyl ester of 2,5-dihydroxy-hexahydro-terephthalic acid, wherein the alkyl group contains from 1 to 4 carbon atoms.

2. A resinous polymerization product comprising the polymeric polycondensation product of dimethyl-2,5-dihydroxy-hexahydro-terephthalate with 2,2,3,3-tetrafluorobutanediol.

3. A resinous polymerization product comprising the polymeric polycondensation product of dimethyl-2,5-dihydroxy-hexahydro-terephthalate with 2,2,3,3,4,4-hexafluoropentanediol.

4. The process of making a resinous polymerization product which comprises (a) reacting a polyfluorinated glycol of the formula:

$$HOCH_2(CF_2)_nCH_2OH$$

wherein $n$ is an integer of from 1 to 4, with a lower alkyl ester of 2,5-dihydroxy-hexahydro-terephthalic acid, wherein the alkyl group contains 1 to 4 carbon atoms, at an elevated temperature to form the transesterification product, (b) adding to the transesterification product with mixing a condensation catalyst selected from the class consisting of antimony trioxide, bismuth trioxide, titanium dioxide, calcium oxide, magnesium oxide and aluminum oxide and (c) heating the transesterification product at an elevated temperature in the presence of the admixed condensation catalyst, the molar ratio of the said polyfluorinated glycol reacted with the said lower alkyl ester of 2,5-dihydroxy-hexahydro-terephthalic acid being within the range of from about 1:1 to about 3:1.

5. The process of claim 4 wherein the condensation catalyst is antimony trioxide.

6. The process of claim 4 wherein the condensation catalyst is bismuth trioxide.

7. The process of claim 4 wherein the condensation catalyst is titanium dioxide.

8. The process of claim 4 wherein the polyfluorinated glycol is reacted at an elevated temperature with the lower alkyl ester of 2,5-dihydroxy-hexahydro-terephthalic acid in the presence of a transesterification catalyst.

9. The process of claim 4 wherein the reaction between the polyfluorinated glycol and the lower alkyl ester of 2,5-dihydroxy-hexahydro-terephthalic acid to form the transesterification product is carried out at a temperature of about 110° C. to about 210° C.

10. The process of claim 4 wherein the transesterification product and the admixed condensation catalyst are heated at a temperature of about 200° C. to about 320° C.

References Cited in the file of this patent
UNITED STATES PATENTS 2,806,057   Finch    Sept. 10, 1957
2,887,468   Caldwell et al.    May 19, 1959
2,902,473   Smith    Sept. 1, 1959

UNITED STATES PATENT OFFICE
CERTIFICATE OF CORRECTION

Patent No. 3,044,988                            July 17, 1962

Gerhard F. Ottmann

It is hereby certified that error appears in the above numbered patent requiring correction and that the said Letters Patent should read as corrected below.

Column 5, line 67, for "control" read -- removal --; column 7, line 57, after "polymerization" insert -- products --.

Signed and sealed this 11th day of December 1962.

(SEAL)
Attest:

ERNEST W. SWIDER                                  DAVID L. LADD
Attesting Officer                                   Commissioner of Patents